(12) United States Patent
Nickels et al.

(10) Patent No.: US 8,765,017 B2
(45) Date of Patent: Jul. 1, 2014

(54) GASIFICATION SYSTEMS AND ASSOCIATED PROCESSES

(75) Inventors: Dale Nickels, Beaver Falls, PA (US); Jerry D. Stephenson, Queen Creek, AZ (US); Steven W. Schenk, Chandler, AZ (US); Tom Weyand, New Brighton, PA (US)

(73) Assignee: Diversified Energy Corp.

( * ) Notice: Subject to any disclaimer, the term of this patent is extended or adjusted under 35 U.S.C. 154(b) by 357 days.

(21) Appl. No.: 12/436,731

(22) Filed: May 6, 2009

(65) Prior Publication Data

US 2010/0283009 A1 Nov. 11, 2010

(51) Int. Cl.
*C01B 3/38* (2006.01)
*C10J 3/46* (2006.01)
*C01B 3/22* (2006.01)

(52) U.S. Cl.
USPC ............................... 252/373; 48/197 R

(58) Field of Classification Search
USPC ............... 75/492; 252/373; 48/202, 92
See application file for complete search history.

(56) References Cited

U.S. PATENT DOCUMENTS

| | | | |
|---|---|---|---|
| 5,645,615 A * | 7/1997 | Malone et al. | 48/92 |
| 5,984,985 A | 11/1999 | Malone | |
| 6,685,754 B2 | 2/2004 | Kindig et al. | |
| 2007/0256360 A1 * | 11/2007 | Kindig et al. | 48/197 A |
| 2007/0256361 A1 | 11/2007 | Kindig | |
| 2008/0166291 A1 | 7/2008 | McLean et al. | |

OTHER PUBLICATIONS

Laplante et al. "The adsorption of cyclohexanone on aluminum oxide-hydroxide powders in relation to its electrocatalytic hydorgenation" 2003, Can. J. Chem. 1039-1043.*
Furimsky et al. "Iron-Catalyzed Gasification of Char in CO2" 1988, 2, 634-639.*
Yun, Y., et al., "Comparison of Syngas and Slag from Three Different Scale Gasifiers using Australian Drayton Coal," Plant Engineering Center, Institute for Advanced Engineering, Gyunggi-do 449-863, Korea. J. Ind. Eng. Chem., vol. 11, No. 2, 2005 (6 pgs.).

* cited by examiner

*Primary Examiner* — Wayne Langel
*Assistant Examiner* — Syed Iqbal
(74) *Attorney, Agent, or Firm* — Perkins Coie LLP

(57) ABSTRACT

Gasification systems and associated processes are disclosed herein. In one embodiment, a gasification process includes simultaneously supplying a carbonaceous material and steam to a gasifier, the gasifier containing a liquid volume containing at least about 10% by weight of iron oxide ($Fe_xO_y$, where x and y are positive integers). The gasification process also includes performing a gasification reaction between the carbonaceous material and steam in the liquid volume, facilitating the gasification reaction with the iron oxide in the liquid volume, and producing a gas from the gasification reaction, the gas containing carbon monoxide (CO) and hydrogen ($H_2$).

22 Claims, 2 Drawing Sheets

GASIFICATION SYSTEMS AND ASSOCIATED PROCESSES

TECHNICAL FIELD

The present disclosure is directed generally to gasification systems and associated processes.

BACKGROUND

Gasification processes generally include reacting a carbonaceous feed material (e.g., coal, petroleum, or biomass) with oxygen and/or steam to produce carbon monoxide and hydrogen. The resulting carbon monoxide and hydrogen mixture is commonly called "synthesis gas" or "syngas."

Syngas can have many industrial applications. For example, syngas may be burned directly in internal combustion engines for generating electricity or driving machinery. In another example, syngas may be used to produce methanol and hydrogen, which in turn may be converted into other useful industrial compounds. Syngas may also be converted into liquid synthetic fuels (e.g., diesel, gasoline, etc.) via the Fischer-Tropsch process and/or other syngas-to-liquid processes.

Conventional gasification systems include fixed-bed gasifiers, fluidized-bed gasifiers, or entrained-flow gasifiers. In fixed-bed gasifiers, the feed material forms a fixed bed through which a gasification agent (e.g., steam, oxygen, and/or air) flows in either a counter-current or co-current flow configuration. In fluidized-bed gasifiers, the feed material does not form a fixed bed but instead is fluidized in steam, oxygen, and/or air. In entrained-flow gasifiers, the carbonaceous feed material is first pulverized and then gasified with oxygen or air in a co-current flow configuration.

The foregoing types of gasifiers suffer from certain operational drawbacks. For example, fixed-bed gasifiers typically require the carbonaceous feed material to have high mechanical strength and be noncaking in order to form a permeable bed. As a result, certain feed materials may not be processed in fixed-bed gasifiers. The conversion efficiencies of fluidized-bed gasifiers may be low due to elutriation of the carbonaceous feed material. Further, entrained-flow gasifiers typically may not be economically operated at small scales and may require an increased amount of oxygen compared to other types of gasifiers. The increased requirement for oxygen can increase the energy consumption of the overall entrained-flow gasification process, resulting in a lower energy efficiency. Accordingly, certain improvements in gasification systems and processes are needed.

DETAILED DESCRIPTION

Various embodiments of gasification systems and associated processes are described below. The term "carbonaceous feed material" generally refers to coal, coke, petroleum, biomass, and/or any material that contains carbon in elemental or combined form. The carbonaceous feed material can include a gasifiable portion and a nongasifiable portion. The gasifiable portion may be converted into carbon monoxide (CO), hydrogen ($H_2$), carbon dioxide ($CO_2$), and/or other gases. The nongasifiable portion is generally referred to as "slag" in the present disclosure. In certain embodiments, the slag can have a composition that is generally similar to the ash composition of the carbonaceous feed material. For example, the slag may include at least one of calcium oxide (CaO), aluminum oxide ($Al_2O_3$), and silicon oxide ($SiO_2$), and other organic and/or inorganic compounds. In other embodiments, the slag may also have other compounds in addition to or in lieu of the ash composition of the carbonaceous feed material. A person skilled in the relevant art will also understand that the disclosure may have additional embodiments and that the disclosure may be practiced without several of the details of the embodiments described below with reference to FIGS. 1 and 2.

Figure 1:
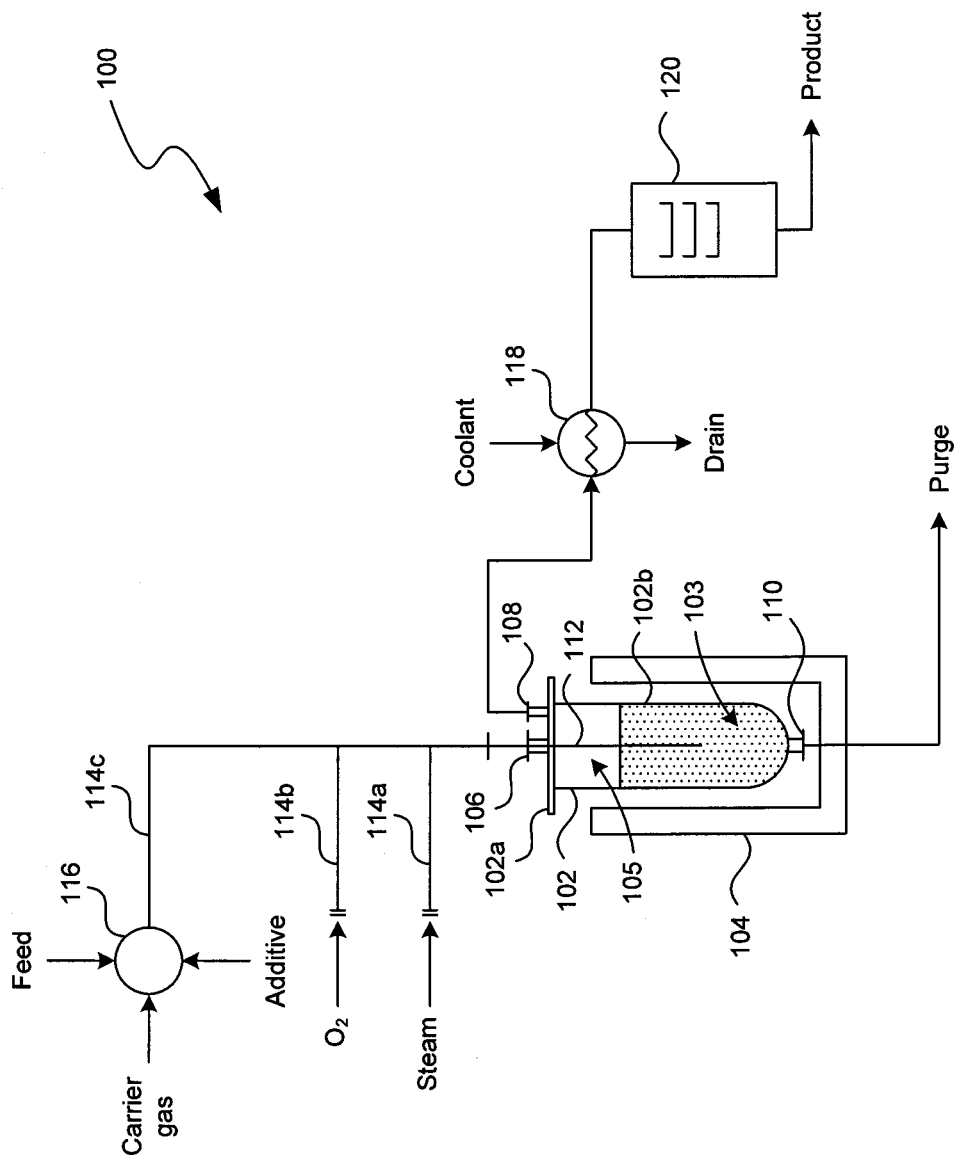
FIG. 1 is a schematic diagram of a gasification system in accordance with embodiments of the disclosure.

FIG. 1 is a schematic diagram of a gasification system 100 in accordance with embodiments of the disclosure. The gasification system 100 can include a gasifier 102 proximate to an optional heater 104 and a plurality of feed lines 114 (identified individually as a steam line 114a, an oxygen line 114b, and a fuel line 114c) coupled to corresponding supply storages (not shown) and the gasifier 102. The optional heater 104 can include an electric furnace, a microwave radiator, and/or other suitable types of heater for supplying thermal energy to the gasifier 102. In the illustrated embodiment, the optional heater 104 is shown as at least partially enclosing the gasifier 102. In other embodiments, the optional heater 104 may be spaced apart from the gasifier 102. In further embodiments, the optional heater 104 may be integrated with the gasifier 102. In yet further embodiments, the optional heater 104 may be omitted, and thermal energy may be supplied to the gasifier 102 by flowing an oxygen-containing gas (e.g., air) via the oxygen line 114b to the gasifier 102 or may be provided via other suitable means.

As shown in FIG. 1, the gasifier 102 can include a top portion 102a engaged with a body portion 102b. The gasifier 102 includes an inlet 106 and an outlet 108 at the top portion 102a. The gasifier 102 also includes an optional purge port 110 at the body portion 102b. The top portion 102a of the gasifier 102 can be constructed from stainless steel, carbon steel, and/or other suitable material with sufficient mechanical strength. The body portion 102b of the gasifier 102 can be constructed from crystallized aluminum oxide ($Al_2O_3$), quartz, nickel-chromium alloys (e.g., Inconel 600), and/or other suitable corrosion-resistant materials. Even though the inlet 106, the outlet 108, and the optional purge port 110 are shown in FIG. 1 at particular locations on the gasifier 102, in other embodiments, at least one of the inlet 106, the outlet 108, and the optional purge port 110 can be located in other suitable locations on the gasifier 102. For example, the inlet 106 and/or the optional purge port 110 may be located on a sidewall of the body portion 102b.

The gasifier 102 can also include a feed tube 112 extending through the inlet 106, past a headspace 105 containing a syngas, and into a liquid volume 103 containing a molten slag in the body portion 102b of the gasifier 102. In one embodiment, the feed tube 112 includes a generally cylindrical tube constructed from stainless steel, nickel-chromium alloys (e.g., Inconel 600), or other suitable material. In other embodiments, the feed tube 112 can include multiple concentric channels (not shown) for carrying different flow streams, and each flow stream can comprise one or more of the same or different materials. Even though only one feed tube 112 is shown in FIG. 1, in further embodiments, the gasifier 102 may include two, three, or any number of desired feed tubes for individually carrying different flow streams. In yet further embodiments, the feed tube 112 may extend into the liquid volume 103 of the gasifier 102 via the sidewall, the bottom, and/or other suitable portions of the gasifier 102.

In the illustrated embodiment, the gasification system 100 includes a mixer 116 coupled to a supply of carrier gas, fuel, and additive. The mixer 116 can include an aspirator, a jet, a static mixer, and/or other suitable types of mixer for mixing the fuel and/or the additive with the carrier gas. In other embodiments, the mixer 116 may be coupled to only one of the fuel and the additive. In further embodiments, the mixer 116 may be omitted, and the fuel and the additive can be individually supplied to the gasifier 102 with corresponding feed lines (not shown).

In a particular embodiment, the fuel can include a low sulfur coal that has been pulverized and/or otherwise reduced in particle size. In other embodiments, the fuel can include a high sulfur coal, coke, biomass, petroleum, and/or other suitable carbonaceous material in desired particle sizes or in liquid form. In several embodiments, the carrier gas can include nitrogen, argon, and/or other suitable gases that are chemically inert with respect to the fuel and the additive. In other embodiments, the carrier gas can include a syngas (e.g., a stream of the syngas produced from the gasifier 102). In certain embodiments, the additive can include iron oxides ($Fe_xO_y$, where x and y are positive integers), iron carbides ($Fe_xC_y$, where x and y are positive integers), iron sulfides ($Fe_xS_y$, where x and y are positive integers), and/or other suitable iron-containing compounds. In the following description, iron oxide (FeO) is used as the additive for illustration purposes. However, one skilled in the art will recognize that, in other embodiments, the additive can include chromium-containing compounds, manganese-containing compounds, cobalt-containing compounds, and/or other suitable metal-containing compounds.

The gasification system 100 can optionally include syngas treatment components. For example, in the illustrated embodiment, the gasification system 100 includes a heat exchanger 118 and a dryer 120 coupled in series to the outlet 108 of the gasifier 102 in series. The heat exchanger 118 can include a tube-and-shell heat exchanger, a plate-and-frame heat exchanger, and/or other types of suitable heat exchanger. The drier 120 can include a desiccant (e.g., calcium sulfate, calcium chloride, and silica gel) and/or other suitable hygroscopic substances. In other embodiments, the gasification system 100 can also include particulate filters, sulfur extraction components, pressure-swing driers, distillation columns, and/or other suitable treatment devices for refining or otherwise treating the syngas from the gasifier 102. In further embodiments, these syngas treatment components may be omitted.

Figure 2:
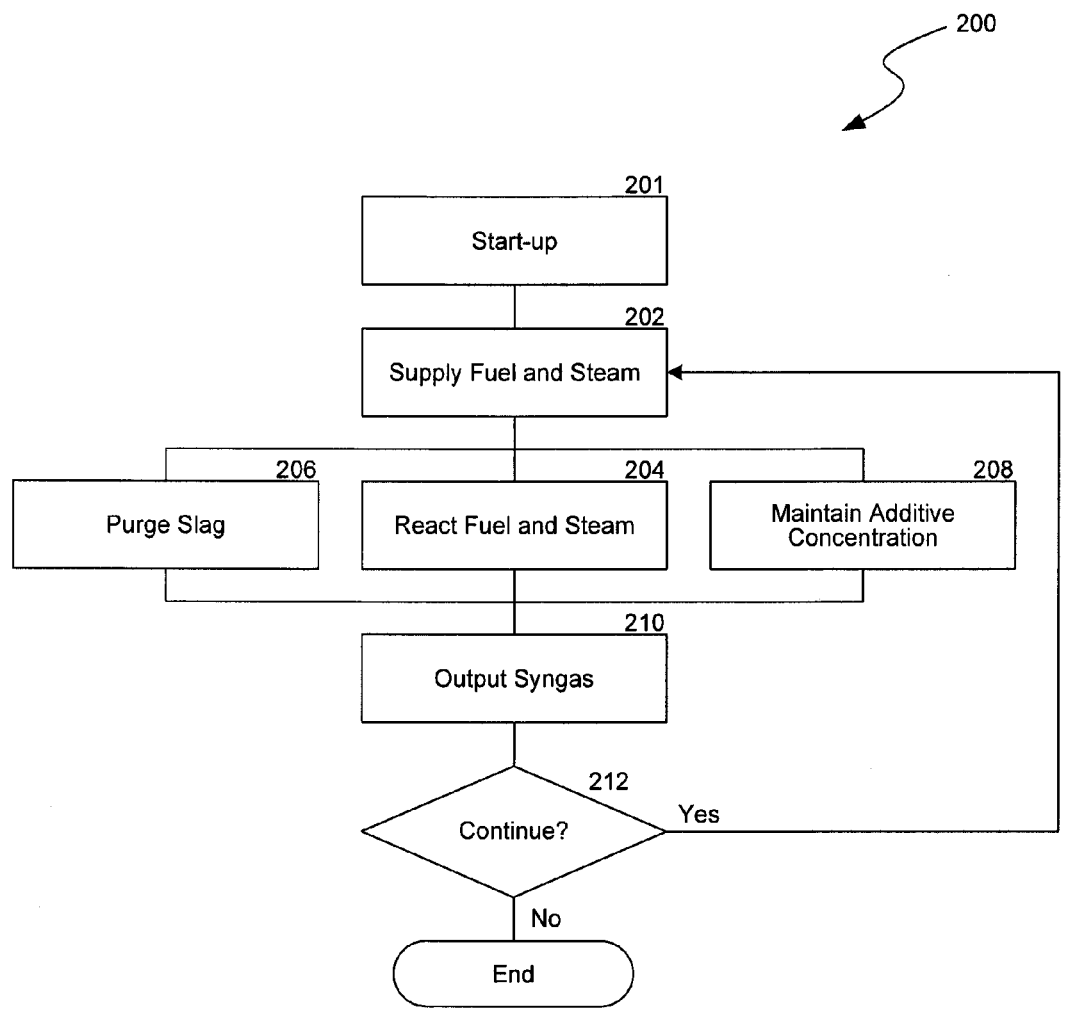
FIG. 2 is a flow diagram of a continuous gasification process suitable for the gasification system of FIG. 1 in accordance with embodiments of the disclosure.

FIG. 2 is a flow diagram of a continuous gasification process 200 suitable for the gasification system 100 of FIG. 1 in accordance with embodiments of the disclosure. Even though the gasification process 200 is described below in the context of the gasification system 100, one skilled in the art will recognize that the gasification process 200 can also be practiced in other gasification systems with different and/or additional process components.

Referring to both FIGS. 1 and 2, an initial stage of the gasification process 200 can include starting up the gasifier 102 to achieve at least partially a steady state (block 201). In certain embodiments, starting up the gasifier 102 can include supplying heat from the optional heater 104 to the gasifier 102 to melt a slag from a previous process. In other embodiments, starting up the gasifier 102 can include disposing an initial charge containing at least one of calcium oxide (CaO), aluminum oxide ($Al_2O_3$), and silicon oxide ($SiO_2$) and a desired amount of the additive (e.g., iron oxide) in the body portion 102b of the gasifier 102. The optional heater 104 can then supply heat to melt the initial charge for forming the liquid volume 103. In yet other embodiments, starting up the gasifier 102 can include disposing an initial charge containing the fuel and a desired amount of the additive in the body portion 102b of the gasifier 102. The optional heater 104 can then supply heat to melt the initial charge of fuel and the additive for forming the liquid volume 103. In any of the foregoing embodiments, the optional heater 104 may be omitted, and instead, a combustible gas (e.g., natural gas) may be fed into the gasifier 102 and ignited to supply the heat. In further embodiments, the gasifier 102 may be started up with other suitable techniques.

After the gasifier 102 is started up, the gasification process 200 can include continuously supplying the fuel and steam to the gasifier 102 (block 202). In the illustrated embodiment, supplying the fuel and steam includes feeding at least one of the fuel and steam through the feed tube 112 into the liquid volume 103, which is believed to improve the mass and/or thermal homogeneity of the liquid volume 103. In other embodiments, the fuel and steam may also be bottom fed or supplied via other suitable techniques.

In certain embodiments, the fuel and steam can be supplied at the stoichiometric ratio for the following gasification reaction:

$$C + H_2O \rightarrow CO + H_2 \tag{Equation I}$$

In other embodiments, the fuel and steam may be supplied with steam in excess of the stoichiometric ratio. Optionally, in further embodiments, the additive and/or oxygen may also be supplied to the gasifier 102, as described in more detail below.

The gasification process 200 can also include continuously reacting the supplied fuel and steam in the liquid volume 103 of the gasifier 102 to produce a syngas containing at least carbon monoxide (CO) and hydrogen ($H_2$) (block 204). In particular embodiments, the liquid volume 103 includes a mixture of a molten slag and the additive (e.g., iron oxide) with an additive concentration of about 10%, 20%, 30%, 40%, 50%, or 60% by weight. The slag has a composition that is generally similar to the ash composition of the carbonaceous fuel. For example, the slag may include at least one of calcium oxide (CaO), aluminum oxide ($Al_2O_3$), and silicon oxide ($SiO_2$), and other organic and/or inorganic compounds. In other embodiments, the liquid volume 103 may include the molten slag containing other suitable compositions at a desired concentration.

In certain embodiments, the liquid volume 103 may be at a temperature of about 1300° C. or at other temperatures at which the slag can exist in a molten state. Without being bound by theory, it is believed that the gasification reaction of Equation I is generally endothermic. As a result, to maintain the liquid volume 103 at the desired temperature, in several embodiments, oxygen may be supplied to the liquid volume to react with the fuel and/or other components of the liquid volume as follows:

$$3C + 2O_2 \rightarrow 2CO + CO_2 \tag{Equation IIA}$$

$$CO + \frac{1}{2}O_2 \rightarrow CO_2 \tag{Equation IIB}$$

$$C + \frac{1}{2}O_2 \rightarrow CO \tag{Equation IIC}$$

$$H_2 + \frac{1}{2}O_2 \rightarrow H_2O \tag{Equation IID}$$

Without being bound by theory, it is believed that the reactions of Equations IIA-IID are generally exothermic and, as a result, can supply sufficient energy to maintain the temperature of the liquid volume 103 at a desired level. In other embodiments, the temperature in the liquid volume 103 may be maintained by supplying heat from the optional heater 104 and/or using other suitable techniques.

Without being bound by theory, it is believed that iron oxide in the molten slag can catalyze or otherwise facilitate the gasification reaction of Equation I under the foregoing operating conditions as follows:

$$C+FeO \rightarrow CO+Fe \quad \text{(Equation III)}$$

$$H_2O+Fe \rightarrow H_2+FeO \quad \text{(Equation IV)}$$

It is believed that, at least in some embodiments, the reactions shown in Equation III and Equation IV would occur simultaneously. As a result, elemental iron in the molten slag is not expected. However, in other embodiments, elemental iron may exist in the molten slag locally due to a lack of mixing, a temperature imbalance in the liquid volume 103, and/or other process conditions. Without being bound by theory, it is believed that a high concentration of iron oxide (e.g., about 40% by weight) in the molten slag may shift an equilibrium of Equation I toward the production of hydrogen.

The gasification process 200 can also include purging the slag from the gasifier 102 (block 206) and maintaining a desired additive concentration in the molten slag (block 208). In certain embodiments, purging the slag includes purging the slag from the liquid volume 103 in a continuous fashion. In these embodiments, an amount of the additive ($f_{additive}$) may be continuously supplied to compensate for the loss of the additive in the purged stream ($f_{purge}$) as follows:

$$f_{additive} = \frac{f_{purge} \times C_{slag}}{C_{additive}} \quad \text{(Formula I)}$$

where $C_{slag}$ is a concentration of iron oxide in the molten slag and $C_{additive}$ is a concentration of iron oxide in the additive. In other embodiments, purging the slag can include periodically purging the slag from the liquid volume 103. In these embodiments, the liquid volume 103 may be sampled after purging the slag, and a suitable amount of the additive may be supplied to bring the iron oxide concentration in the slag to a desired level. In further embodiments, purging the slag may be omitted, and the gasification system 100 may be operated in a batch mode.

In certain embodiments, the produced syngas can include carbon monoxide (CO), hydrogen ($H_2$), carbon dioxide ($CO_2$), and water vapor ($H_2O$) at a combined concentration of about 98.5% to about 99.6%. The syngas can also include trace amounts of hydrogen sulfide ($H_2S$), methane ($CH_4$), and/or other impurities. The gasification process 200 may also include outputting the produced syngas from the gasifier 102 (block 210) and optionally treating the produced syngas for removing impurities. For example, in the illustrated embodiment, the gasifier 102 supplies the produced syngas to the heat exchanger 118 to be cooled by a coolant (e.g., cooling water) before the dryer 120 removes any residual water vapor ($H_2O$) from the syngas. In other embodiments, the gasification process 200 may also include removing hydrogen sulfide ($H_2S$) from the syngas in a scrubber and/or other suitable device.

The gasification process 200 can include determining whether the process should be continued (block 212). If a determination is made to continue, the process reverts to block 202. If a determination is made to terminate (e.g., when an operator indicates to terminate the process or the process has encountered a serious fault), then the process ends.

Embodiments of the gasification system 100 and the gasification process 200 may be more tolerant to process upset conditions. For example, the fuel supplied to the gasifier 102 may contain more moisture than anticipated, and so the gasification reaction becomes more endothermic. Such a process change may upset the delicate control balance of conventional gasification systems (e.g., entrained-flow gasifiers). Embodiments of the gasification system 100 can be more tolerant to such a process change because the liquid volume 103 in the gasifier 102 has a large thermal inertia to buffer such a process change.

Embodiments of the gasification system 100 can require less initial capital to construct than conventional systems because the gasifier 102 has a simpler structure than conventional gasifiers. For example, certain embodiments of the gasifier 102 do not require a large number of feed ports, seals, and other support components at precise locations on the gasifier. As a result, embodiments of the gasifier 102 may have lower cost to construct when compared to conventional gasifiers.

Embodiments of the gasification system 100 can operate efficiently at small scales to produce high quality syngas. Conventional gasifiers typically operate at relatively low temperatures at small scales, and may insufficiently crack hydrocarbons in a feed material to produce "dirty" syngas (e.g., with appreciable tart and/or oil content). In contrast, certain embodiments of the gasification system 100 can operate at relatively high temperatures (e.g., 1300° C.) even at small scales to produce a "clean" syngas (with low or no appreciable tar and/or oil content).

Even though only certain process components of the gasification system 100 are shown in FIG. 1, in certain embodiments, the gasification system 100 may include additional and/or different process components. For example, the gasification system 100 can also include control valves, flow meters, temperature sensors, pressure sensors, programmable logic controllers, and/or other suitable process components for facilitating the operation of the gasification system 100. In further embodiments, the gasifier 102 may not include the feed tube 112 but instead may include a mixer in the liquid volume 103.

Experiments to gasify a carbonaceous feed were performed in a gasification system generally similar in function and in structure to that shown in FIG. 1. During the experiments, it was observed that the gasification system gasified the carbonaceous feed to produce a syngas containing carbon monoxide (CO) and hydrogen ($H_2$).

From the foregoing, it will be appreciated that specific embodiments of the disclosure have been described herein for purposes of illustration, but that various modifications may be made without deviating from the disclosure. For example, many of the elements of one embodiment may be combined with other embodiments in addition to or in lieu of the elements of the other embodiments. Accordingly, the disclosure is not limited except as by the appended claims.

We claim:
1. A gasification process, comprising:
simultaneously supplying a carbonaceous material and water to a gasifier, the gasifier containing a liquid volume having an iron-containing compound;
reacting the carbonaceous material and the water in the liquid volume facilitated by the iron-containing compound;
continuously purging a portion of the liquid volume from the gasifier;
maintaining a concentration of the iron-containing compound in a remaining portion of the liquid volume by continuously supplying iron-containing compound to the gasifier with the carbonaceous material and the water; and producing a gas from reacting the carbonaceous material, the gas containing carbon monoxide (CO) and hydrogen ($H_2$).

2. The gasification process of claim 1 wherein:

simultaneously supplying the carbonaceous material and water to the gasifier includes simultaneously supplying the carbonaceous material and water to the same portion of the liquid volume;

the liquid volume includes slag;

the iron-containing compound is iron oxide ($Fe_xO_y$, where x and y are positive integers); and producing the gas includes simultaneously producing the gas, reducing the iron oxide to produce iron (Fe), and oxidizing the iron to produce iron oxide within the portion of the liquid volume.

3. The gasification process of claim 1 wherein simultaneously supplying the carbonaceous material and the water includes simultaneously supplying the carbonaceous material and the water at a stoichiometric ratio for the following reaction:

$$C+H_2O \rightarrow CO+H_2.$$

4. The gasification process of claim 1 wherein simultaneously supplying the carbonaceous material and the water includes simultaneously feeding the carbonaceous material and the water to the gasifier using a shared feed tube.

5. The gasification process of claim 1 wherein producing the gas includes simultaneously carrying out the following reactions:

$$C+FeO \rightarrow CO+Fe$$

$$H_2O+Fe \rightarrow H_2+FeO.$$

6. The gasification process of claim 1 wherein maintaining the concentration of the iron-containing compound in the remaining portion of the liquid volume includes maintaining the concentration above about 40% by weight to favor production of hydrogen ($H_2$).

7. The gasification process of claim 1 wherein maintaining the concentration of the iron-containing compound includes continuously supplying an additive having the iron-containing compound to the gasifier with the carbonaceous material and the water according to the following formula:

$$f_{additive} = \frac{f_{purge} \times C_{purge}}{C_{additive}}$$

where $f_{additive}$ is a flow rate of the additive supplied to the gasifier, $f_{purge}$ is a flow rate of the purged portion of the liquid volume, $C_{purge}$ is a concentration of the iron-containing compound in the purged portion of the liquid volume, and $C_{additive}$ is a concentration of the iron-containing compound in the additive.

8. The gasification process of claim 1 wherein:

reacting the carbonaceous material and water in the liquid volume includes reacting the carbonaceous material and water in the liquid volume while the liquid volume contains at least about 10% by weight of the iron-containing compound; and the process further comprises outputting the gas from the gasifier via an outlet connected to a headspace above the liquid volume.

9. The gasification process of claim 8 wherein the iron-containing compound iron oxide ($Fe_xO_y$, where x and y are positive integers), iron carbide ($Fe_xC_y$, where x and y are positive integers), or iron sulfide ($Fe_xS_y$, where x and y are positive integers).

10. The gasification process of claim 9 wherein reacting the carbonaceous material and water in the liquid volume includes reacting the carbonaceous material and water in the liquid volume while the liquid volume contains at least one of calcium oxide (CaO), aluminum oxide ($Al_2O_3$), and silicon oxide ($SiO_2$).

11. The gasification process of claim 10 wherein:

the iron-containing compound is iron oxide (FeO); and reacting the carbonaceous material and the water in the liquid volume facilitated by the iron-containing compound includes catalyzing the following reaction:

$$C+H_2O \rightarrow CO+H_2$$

as follows:

$$C+FeO \rightarrow CO+Fe$$

$$H_2O-Fe \rightarrow H_2+FeO.$$

12. The gasification process of claim 10, further comprising supplying oxygen ($O_2$) to the gasifier and reacting the oxygen within the gasifier according to at least one of the following reactions:

$$3C + 2O_2 \rightarrow 2CO + CO_2$$

$$CO + \frac{1}{2}O_2 \rightarrow CO_2$$

$$C + \frac{1}{2}O_2 \rightarrow CO$$

$$H_2 + \frac{1}{2}O_2 \rightarrow H_2O.$$

13. The gasification process of claim 2, further comprising supplying oxygen ($O_2$) to the gasifier to maintain a temperature of the liquid volume.

14. The gasification process of claim 2 wherein:

the supplied carbonaceous material includes a gasifiable portion and a nongasifiable portion; and producing the gas from reacting the carbonaceous material includes reacting the gasifiable portion to produce the gas and releasing the nongasifiable portion into the liquid volume as additional slag.

15. The gasification process of claim 2 wherein maintaining the concentration of the iron oxide in the remaining portion of the liquid volume includes maintaining the concentration above about 10% by weight.

16. A gasification process, comprising:

simultaneously supplying a carbonaceous material and water to a gasifier, the gasifier containing a liquid volume having an iron-containing compound;

reacting the carbonaceous material and the water in the liquid volume facilitated by the iron-containing compound;

periodically purging a portion of the liquid volume from the gasifier;

maintaining a concentration of the iron-containing compound in a remaining portion of the liquid volume by:

taking a sample of the liquid volume;

analyzing the sample to determine a concentration of the iron-containing compound in the liquid volume; and supplying an amount of the iron-containing compound to the gasifier based on the determined concentration.

17. The gasification process of claim 16 wherein maintaining the concentration of the iron-containing compound in the remaining portion of the liquid volume includes maintaining the concentration above about 10% by weight.

18. The gasification process of claim 16 wherein simultaneously supplying the carbonaceous material and the water includes simultaneously feeding the carbonaceous material and the water to the gasifier using a shared feed tube.

19. The gasification process of claim 16 wherein maintaining the concentration of the iron-containing compound in the remaining portion of the liquid volume includes maintaining the concentration above about 40% by weight.

20. The gasification process of claim 16 wherein reacting the carbonaceous material and the water in the liquid volume includes reacting the carbonaceous material and the water in the liquid volume while the liquid volume contains at least one of calcium oxide ($CaO$), aluminum oxide ($Al_2O_3$), and silicon oxide ($SiO_2$).

21. The gasification process of claim 16, further comprising supplying oxygen ($O_2$) to the gasifier and reacting the oxygen within the gasifier according to at least one of the following reactions:

$$3C + 2O_2 \rightarrow 2CO + CO_2$$

$$CO + \frac{1}{2}O_2 \rightarrow CO_2$$

$$C + \frac{1}{2}O_2 \rightarrow CO$$

$$H_2 + \frac{1}{2}O_2 \rightarrow H_2O.$$

22. The gasification process of claim 16, further comprising supplying oxygen ($O_2$) to the gasifier to maintain a temperature of the liquid volume.

* * * * *

UNITED STATES PATENT AND TRADEMARK OFFICE
CERTIFICATE OF CORRECTION

PATENT NO. : 8,765,017 B2  Page 1 of 1
APPLICATION NO. : 12/436731
DATED : July 1, 2014
INVENTOR(S) : Dale Nickels et al.

It is certified that error appears in the above-identified patent and that said Letters Patent is hereby corrected as shown below:

On the Title Page, Item (56), in column 2, Other Publications, line 3, delete "hydorgenation" and insert -- hydrogenation --, therefor.

In the Specification

In column 3, line 23, delete "($Fe_xO_{xy}$" and insert -- ($Fe_xO_y$ --, therefor.

In the claims

In column 8, line 2, in claim 9, delete "compound" and insert -- compound is --, therefor.

Signed and Sealed this
Fourteenth Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,765,017 B2 | Page 1 of 1 |
| APPLICATION NO. | : 12/436731 | |
| DATED | : July 1, 2014 | |
| INVENTOR(S) | : Nickels et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 394 days.

Signed and Sealed this
Twenty-fifth Day of August, 2015

Michelle K. Lee
*Director of the United States Patent and Trademark Office*